United States Patent Office 3,248,840
Patented May 3, 1966

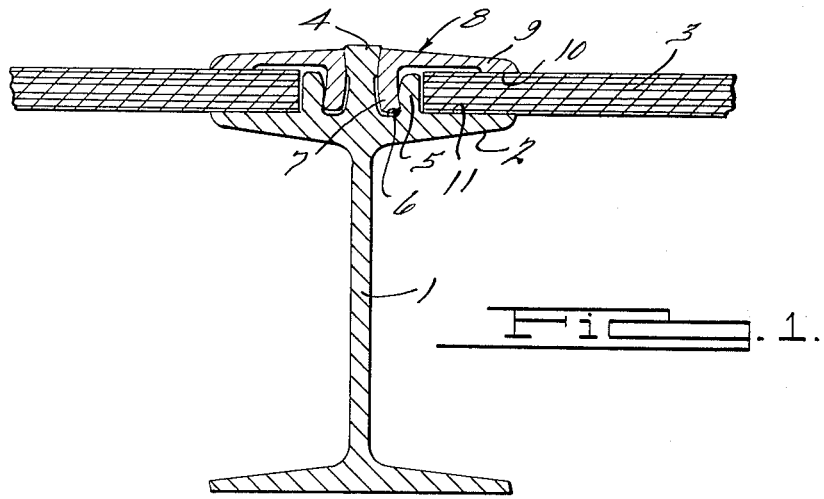
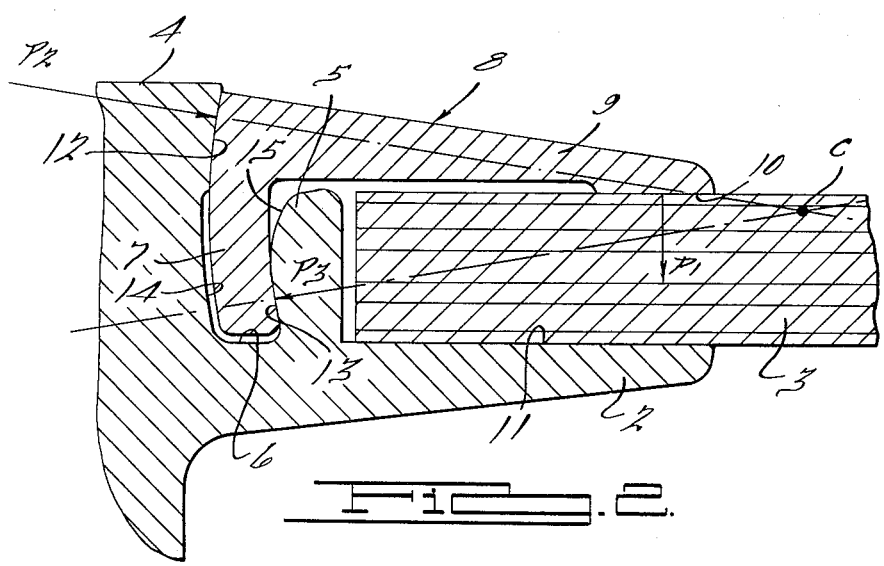
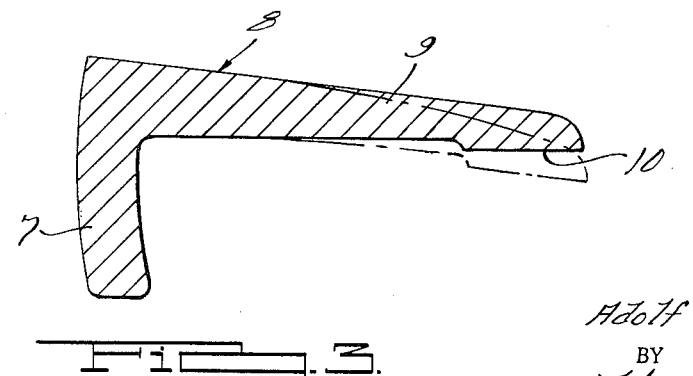

3,248,840
FASTENING DEVICE
Adolf Helmer Petterson, Skarsgatan 70,
Goteborg, Sweden
Filed Feb. 18, 1963, Ser. No. 259,149
Claims priority, application Sweden, Feb. 19, 1962,
1,785/62
5 Claims. (Cl. 52—732)

The present invention relates to fastening devices and more particularly to novel means for mounting or otherwise fastening sheet-like elements, such as metal or plywood sheets, fiberboard panels, glass sheets, panels of sandwich construction, plastic sheets, and any other similar type materials.

One of the primary objects of the present invention is to provide a fastening device of the above type which is extremely simple and inexpensive in construction and assembly, and yet which has self-locking characteristics resulting in high holding forces upon the application of relatively small assembly forces.

Another object of this invention resides in the provision of a fastening device of the above-described type which does not require movement of the panel being fastened in a direction parallel to the plane thereof during assembly, whereby a panel may be secured about its entire periphery by simply moving it transversely into a pre-assembled framework constructed according to the principles of this invention, rather than requiring that the framework be assembled about the panel after the latter is positioned.

Another object concerns the provision of a fastening device of the aforedescribed type which will tolerate normal expansion and contraction of the fastened panel, which will give a tight sealed joint without the application of an adhesive, which can be assembled using only a mallet and no special-purpose tools, and which may be subsequently unfastened if desired.

These and other objects of the present invention will become apparent from consideration of the specification taken in connection with the accompanying drawings in which there is illustrated a single embodiment of the present invention, by way of example, and wherein:

FIGURE 1 is a cross-sectional view of a fastening device incorporating the principles of the present invention;

FIGURE 2 is an enlarged view of a portion thereof; and

FIGURE 3 is a view of one of the elements shown in FIGURE 2 in its relaxed and stressed conditions.

Generally speaking, the present invention comprises an elongated support member and an elongated fastening member, wherein the support member is provided with a support surface for engaging one side of the panel to be fastened and a longitudinally extending groove transverse to the support surface, and wherein the fastening member is provided with a first flange adapted to be forced into the groove and a second flange having a surface thereon for engaging the other side of the panel to be fastened to clamp the latter between the two surfaces.

The elongated support member may for the most part be of any desired length or cross-sectional shape, and is illustrated as being an I-beam 1 having at one edge laterally projecting flanges 2, the free ends of which are provided with support surfaces 11 for engaging one side of panels or sheets 3. The beam illustrated is provided with two of the present fastening devices, however since they are identical only one will be described. Also provided are integral projections 4 and 5 projecting above surface 11 and defining a longitudinally extending groove 6 therebetween. Projection 4 is located a greater distance from sheet 3 than projection 5 and is higher or projects further away from surface 11 than the latter.

The elongated fastening member, indicated at 8, comprises a first flange 7 and a second transverse flange 9 having a surface 10 thereon adapted to engage the other side of sheet 3. Fastening member 8 is preferably formed from a material having resilient properties, such as steel, or an aluminum alloy or the like, so that flange 9 will be flexible in a transverse direction.

Groove 6 has parallel and preferably cylindrical sides 12 and 13, the center of curvature of the cylindrical surfaces being positioned beyond and below surface 10 of flange 9 when the fastening device is assembled, as indicated at $c$ in FIGURE 2. The configuration of the sides of flange 7 on fastening member 8 may be the same as that of the sides of groove 6, and they both should be of a size which would enable the flange to be easily inserted into the groove in the absence of a panel or sheet 3. In addition, to reduce assembly forces, side 12 may be cut away as at 14 so that flange 10 will engage only the upper portion thereof and the upper portion of side 13 may be rounded as at 15 so that flange 7 only engages the lower portion thereof.

In FIGURE 3 there is illustrated the relaxed and stressed configurations which elongated fastening member 8 may take. The member is shown in solid lines in its stressed condition, i.e., the condition illustrated in FIGURE 2 wherein clamping forces are exerted on panel 3. In its relaxed state, elongated fastening member 8 may be of the cross-sectional configuration illustrated in dotted lines in FIGURE 3, so that when it is assembled the stresses created by the deflection of flange 9 will create a holding or clamping force.

In order to assemble the joint of the present invention, a panel is placed in engagment with support surface 11, the edge thereof being slightly spaced from projection 5 to allow for expansion of the panel, and flange 7 of the fastening member is inserted into groove 6 and driven down so that surface 10 will apply a downwardly directed force P1 to clamp the panel against surface 11. This force results from the coaction of the sides of groove 6 and flange 7 which tends to exert a clockwise torsional moment on the latter, and hence on the fastening member. As can be seen, side 12 gives rise to a force P2 and side 13 to a force P3, which two forces create a moment in the clockwise direction. Consequently, panel 3 will be clamped against support surface 11 by virtue of this torsional moment, independently of any holding friction which might exist, and both the panel and fastening member 8 will be retained in position without other fastening means.

Surfaces 11 and 10 extend longitudinally for the length of members 8 and 1, respectively, so that a uniform clamping force will be maintained along the edge of sheet 3. Due to the moment arms of the disclosed arrangement, the locking force of the device is considerably greater than the force required for inserting flange 7 into groove 6.

Although only one embodiment has been illustrated, it will be appreciated that the invention may be embodied in other arrangements. For example, groove 6 and flange 7 may be provided with plane parallel sides. In addition if the joint is likely to be subject to extreme forces, primarily in a direction parallel to the plane of the secured panel, surface 10 may be provided with teeth or other suitable projections adapted to be forced into the secured panel or to fit within preformed recesses therein. Alternately, or in addition, adhesives may be used to further increase the strength of the joint. Because of the uniformly distributed pressures which exist in joints of the present invention, the adhesives will perform in a highly efficient manner. Furthermore, if it is desired that the joint be easily disassembled, flange 2 may be provided with a plurality of spaced holes extending from the bottom surface thereof into groove 6. Thus, when removal of member 8 is desired, a suitable pin may be inserted through these holes to force flange 7 out of groove 6.

Thus there is discloesd in the above description and in the drawings an exemplary embodiment of the invention which fully and effectively accomplishes the objects thereof. However, it will be apparent that variations in the details of construction may be indulged in without departing from the sphere of the invention herein described, or the scope of the appended claims.

What is claimed is:

1. A fastening device for panels comprising: an elongated support member having a support surface thereon for engaging one side of a panel to be fastened; means defining an elongated first surface on said support member; means defining an elongated second surface on said support member, said second surface generally facing said first surface, at least one of said surfaces being generally cylindrical and having an axis of curvature; an elongated fastening member formed of a resilient material and including an elongated first flange having a pair of elongated surfaces thereon, said first flange being driven between said first and second surfaces on said support member with said pair of surfaces engaging said first and second surfaces respectively; and means defining an elongated second flange on said fastening member having a support surface thereon for engaging the other side of the panel to be fastened, said support surface on said fastening member being positioned with respect to said pair of surfaces such that when said first flange is driven between said first and second surfaces said fastening member will become resiliently stressed to resiliently clamp the panel against the support surface on said support member, said axis of curvature lying beyond and below said support surface on said fastening member.

2. A fastening device as claimed in claim 1, wherein the other of said first and second surfaces on said support member is generally cylindrical and has an axis of curvature coincident with the axis of curvature of said one surface on said support member.

3. A fastening device as claimed in claim 1, wherein said support member and said fastening member are each formed of an aluminum alloy.

4. A fastening device for panels comprising: an elongated support member having a support surface thereon for engaging one side of a panel to be fastened; means defining an elongated first surface on said support member; means defining an elongated second surface on said support member, said second surface generally facing said first surface, both of said surfaces being generally cylindrical and having a common axis of curvature; an elongated fastening member formed of a resilient material and including an elongated first flange having a pair of elongated surfaces thereon, said first flange being driven between said first and second surfaces on said support member with said pair of surfaces engaging said first and second surfaces respectively; and means defining an elongated second flange on said fastening member having a support surface thereon for engaging the other side of the panel to be fastened, said support surface on said fastening member being positioned with respect to said pair of surfaces such that when said first flange is driven between said first and second surfaces said fastening member will become resiliently stressed to resiliently clamp the panel against the support surface on said support member, said axis of curvature lying beyond said support surface on said fastening member.

5. A fastening device for panels comprising: an elongated support member having a support surface thereon for engaging one side of a panel to be fastened; means defining an elongated first surface on said support member; means defining an elongated second surface on said support member, said second surface generally facing said first surface, both of said surfaces being generally cylindrical and having a common axis of curvature; an elongated fastening member formed of a resilient material and including an elongated first flange having a pair of elongated surfaces thereon, said first flange being driven between said first and second surfaces on said support member with said pair of surfaces engaging said first and second surfaces respectively; and means defining an elongated second flange on said fastening member having a support surface thereon for engaging the other side of the panel to be fastened, said support surface on said fastening member being positioned with respect to said pair of surfaces such that when said first flange is driven between said first and second surfaces said fastening member will become resiliently stressed to resiliently clamp the panel against the support surface on said support member, said axis of curvature lying below said support surface on said fastening member.

References Cited by the Examiner

UNITED STATES PATENTS

| | | | |
|---|---|---|---|
| 2,304,423 | 12/1942 | Schiller | 189—76 |
| 2,363,429 | 11/1944 | Lowry | 52—396 |
| 3,020,605 | 2/1962 | Lemme | 20—56.4 X |

FRANK L. ABBOTT, *Primary Examiner.*

JACOB NACKENOFF, *Examiner.*

J. E. MURTAGH, *Assistant Examiner.*